United States Patent [19]
Long et al.

[11] Patent Number: 5,868,126
[45] Date of Patent: Feb. 9, 1999

[54] LPG CANISTER CONNECTOR FOR COMBUSTION APPLIANCE

[75] Inventors: Norris R. Long, Wichita; Franklin T. Schmidt, Mulvane, both of Kans.; Gary E. van Deursen, Evergreen, Colo.; Randall L. May, Andover, Kans.; Harold J. Pfountz, Conifer, Colo.; David M. Thorpe, Portland, Oreg.; Jan Hippen, Portland, Oreg.; Michael Knodt, Portland, Oreg.

[73] Assignee: The Coleman Company, Inc., Wichita, Kans.

[21] Appl. No.: 746,284

[22] Filed: Nov. 7, 1996

Related U.S. Application Data

[63] Continuation of Ser. No. 695,424, Aug. 12, 1996, abandoned.

[51] Int. Cl.⁶ .................................................. F24C 5/20
[52] U.S. Cl. ........................ 126/38; 126/25 R; 126/40; 126/41 R
[58] Field of Search .......................... 126/38, 40, 25 R, 126/41 R; 137/322, 318; 431/344

[56] References Cited

U.S. PATENT DOCUMENTS

| | | |
|---|---|---|
| 154,484 | 8/1874 | Houston . |
| 163,202 | 5/1875 | Houston . |
| 165,444 | 7/1875 | Gorham et al. . |
| 1,214,086 | 1/1917 | Shaw . |
| 1,237,453 | 8/1917 | Ball . |
| 1,238,084 | 8/1917 | Ball . |
| 2,465,572 | 3/1949 | Bramming ............................. 158/33 |
| 3,900,281 | 8/1975 | Penberthy ............................. 431/344 |
| 3,907,490 | 9/1975 | Schaller ................................ 126/38 X |
| 3,933,283 | 1/1976 | Hoagland ........................... 222/402.13 |
| 4,082,993 | 4/1978 | Oakes .................................... 126/40 X |
| 4,092,974 | 6/1978 | Zenaburo ................................ 126/38 |
| 4,177,790 | 12/1979 | Zenzaburo ........................... 126/40 X |

(List continued on next page.)

FOREIGN PATENT DOCUMENTS

| | | |
|---|---|---|
| 0 278 873 | 8/1988 | European Pat. Off. . |
| 946456 | 3/1995 | France . |
| 2342309 | 2/1974 | Germany ................................ 126/40 |
| 7-14284 | 11/1991 | Japan . |
| 2 262 156 | 4/1991 | United Kingdom . |
| 2 262 157 | 4/1991 | United Kingdom . |

OTHER PUBLICATIONS

MSR Whisper Lite Operating Instructions; 1994.
MRS Rapid Fire Isobutane Stove Instruction Book; 1994.
Peak 1 Brochure 100–069 5M/895 DL; 1992.
Epigas Catalog page; 1991.
Leisuretime with Camping Gaz Catalog Page; 1995.
Miscellaneous Catalog Pages; 1995.
Package for Peak 1 Stove Model 3140–700T (No Date).
Package for Peak 1 Stove Model 3093–700T (No Date).
"Lite Weight Stoves", Off Belay Magazine, 1973, Model 3140–700T.
Instructions for Peak 1 Micro Stove, Model 3093–700T, Aug., 1995.
Instructions for Peak 1 Alpine Stove, Model 3093–700T, Aug., 1995.
Esbit/Gaskocher Catalog Page (No Date).
Markill Catalog page (No Date).
Optimus Catalog page (No Date).

(List continued on next page.)

*Primary Examiner*—Larry Jones
*Attorney, Agent, or Firm*—Fitzpatrick, Cella, Harper & Scinto

[57] ABSTRACT

An LPG canister connector for a combustion appliance having a flow path from a canister containing liquid fuel and having a cap with outlet means at the upstream end of the flow path, a valve assembly adapted to be connected to the cap and equipped with a conduit adapted to be connected to a combustion appliance at the downstream end of the flow path, and promoters for vaporization of said fuel being located intermediate the ends of the flow path.

25 Claims, 14 Drawing Sheets

U.S. PATENT DOCUMENTS

| | | | |
|---|---|---|---|
| 4,305,180 | 12/1981 | Schwartz | 439/296 |
| 4,390,160 | 6/1983 | Reed | 251/149.6 |
| 4,487,469 | 12/1984 | Bjork | 439/332 |
| 4,518,162 | 5/1985 | Oates | 482/93 |
| 4,545,759 | 10/1985 | Giles et al. | 431/344 |
| 4,815,541 | 3/1989 | Arrington | 169/74 |
| 4,865,292 | 9/1989 | Elkman | 251/149.6 |
| 4,904,182 | 2/1990 | Leshner | 126/38 X |
| 5,065,735 | 11/1991 | Bourgeois et al. | 126/40 |
| 5,070,858 | 12/1991 | Wang | 126/38 |
| 5,111,838 | 5/1992 | Langston | 137/223 |
| 5,213,309 | 5/1993 | Nakishima | 251/149.6 |
| 5,280,876 | 1/1994 | Atkins | 251/149.1 |
| 5,330,154 | 7/1994 | Mashburn | 251/144 |
| 5,370,527 | 12/1994 | Hefling | 431/247 |
| 5,425,354 | 6/1995 | Park | 126/38 X |
| 5,513,624 | 5/1996 | Vorhis | 126/40 X |

OTHER PUBLICATIONS

Comparison Chart Sports Afield Mar. 1992, pp. 93–94.

Coleman Model 5402 LP Gas Picnic Stove, Coleman Wholesalers' Confidential Price Schedule, Fall, 1996.

Coleman Model No. 5101 LP Gas Lantern, Coleman Outing Products Parts Catalog, 1958.

Coleman Model No. 5104 LP Gas Lantern and Model 5403 LP Gas Stove, Coleman Catalog p. circa 1963.

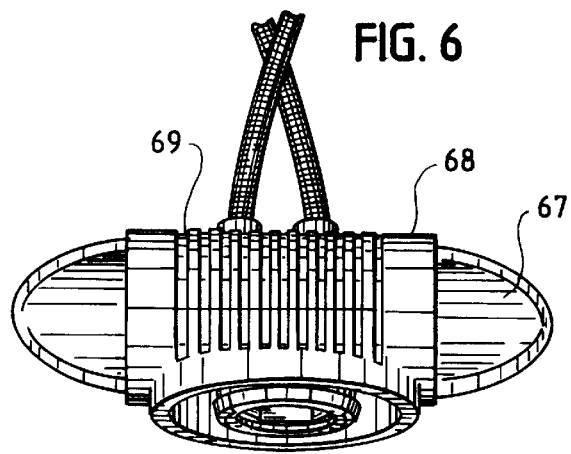
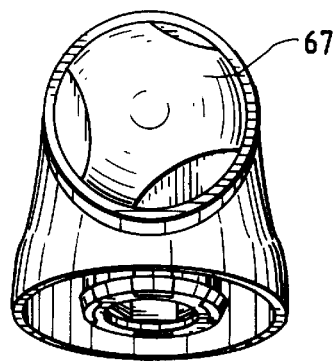
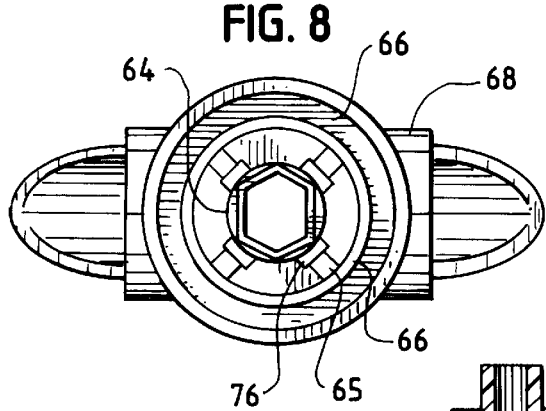
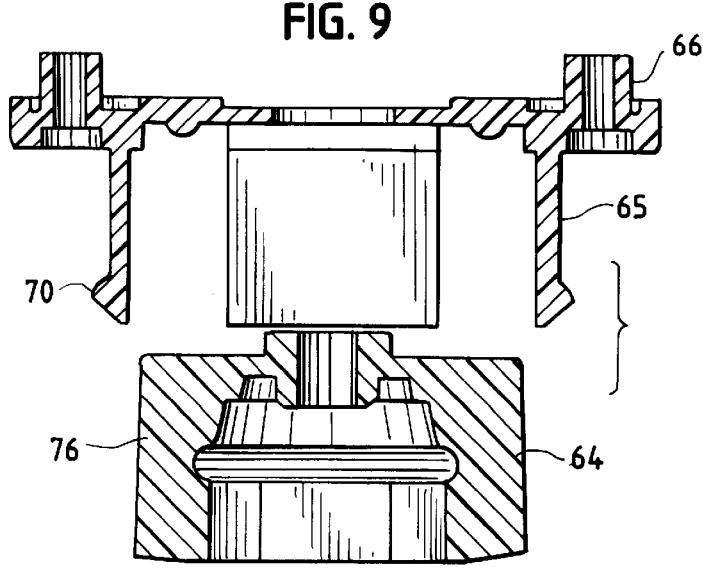

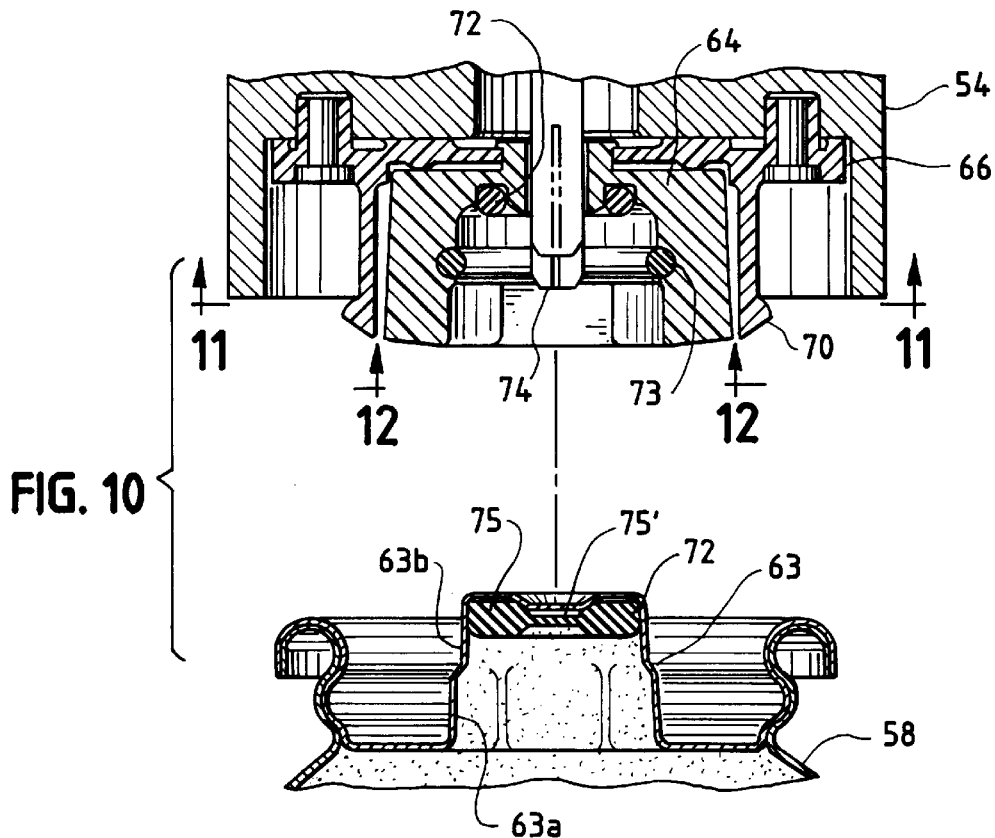
FIG. 10
FIG. 11
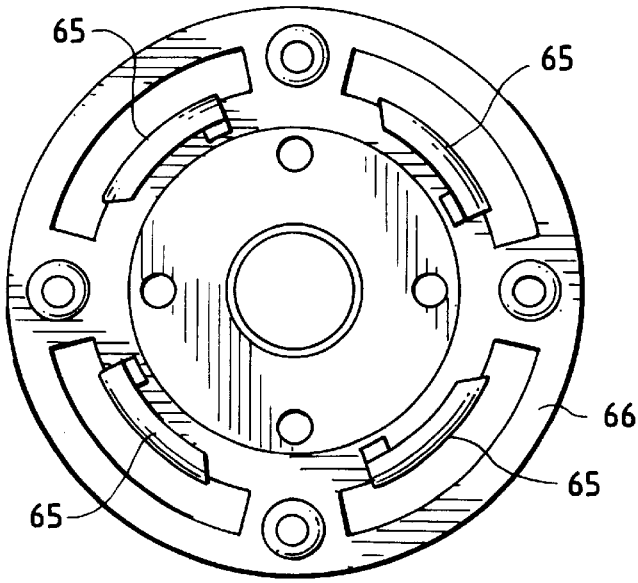
FIG. 12
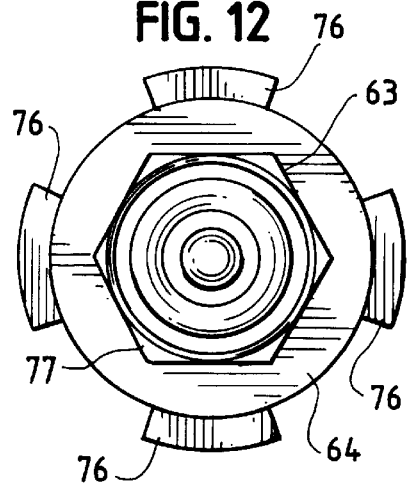

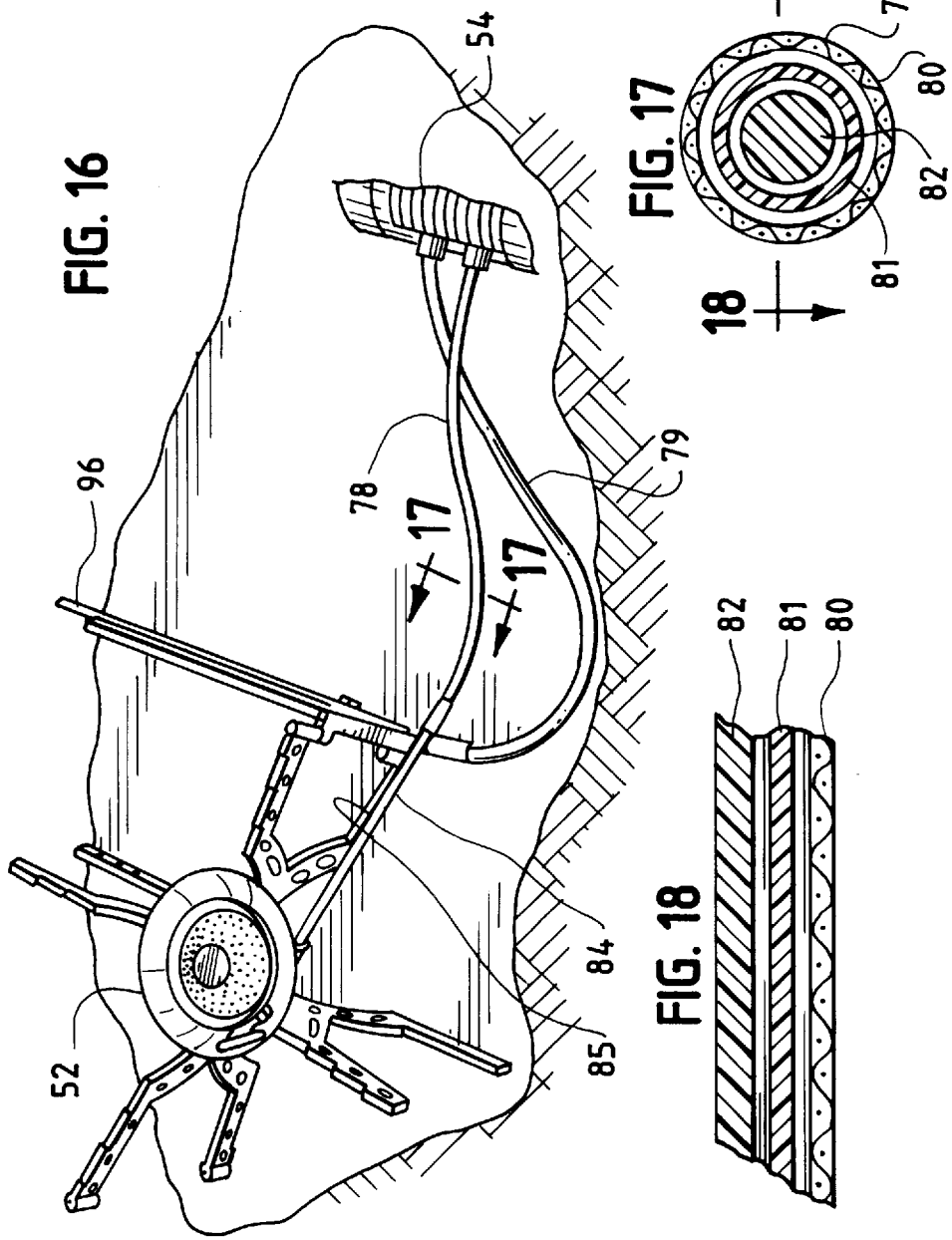

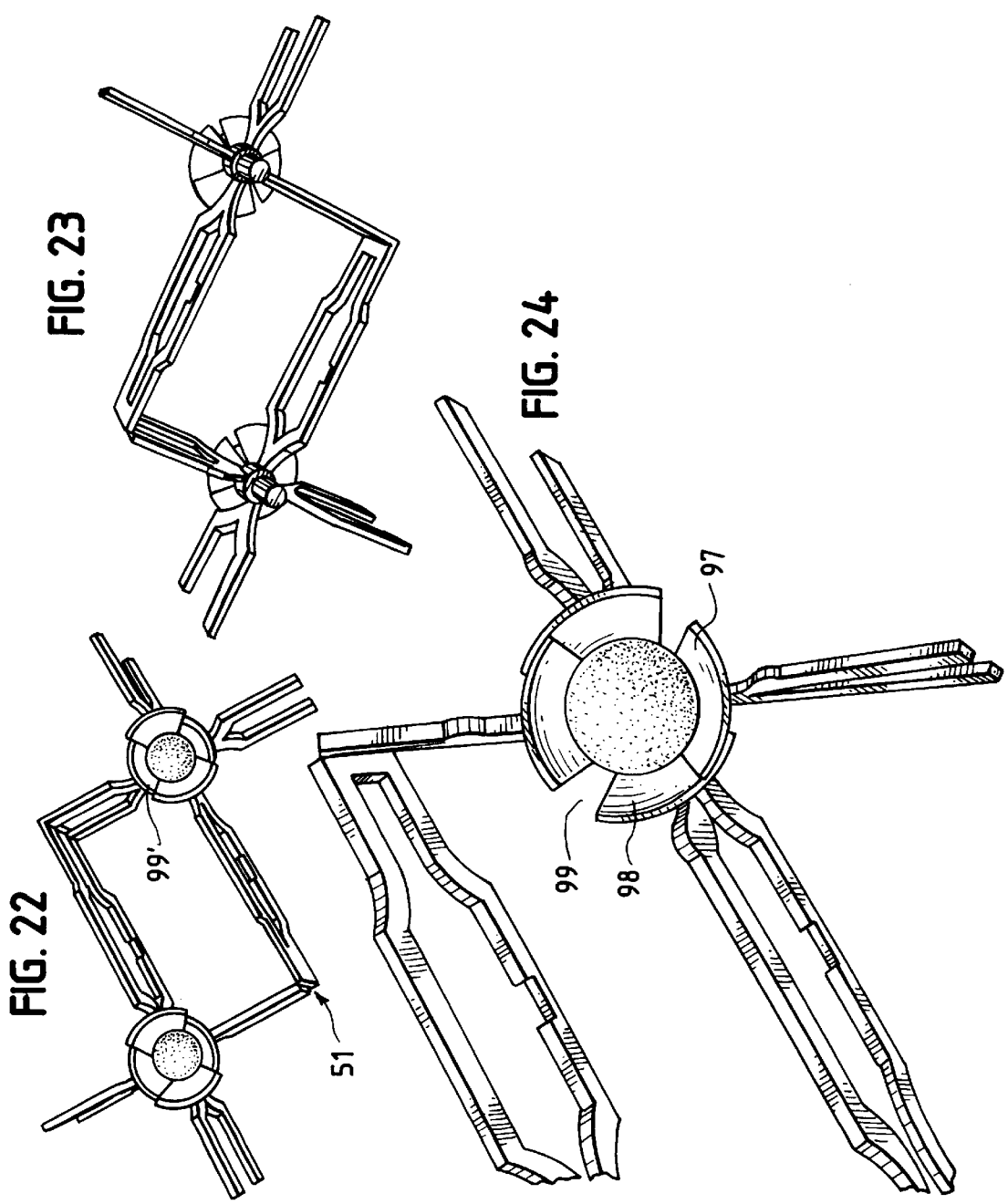

LPG CANISTER CONNECTOR FOR COMBUSTION APPLIANCE

RELATED APPLICATION

This application is a continuation of U.S. patent application entitled "LPN CANISTER CONNECTOR FOR COMBUSTION APPLIANCE," Ser. No. 08/695,424, filed Aug. 12, 1996 now abandoned.

BACKGROUND AND SUMMARY OF INVENTION

This invention relates to an LPG canister connector for a combustion appliance and, more particularly, to a connector which embodies a number of unique components providing operating convenience.

The invention has advantageous application to a variety of combustion appliances such as blow torches, heaters, soldering irons and lanterns with one especially advantageous use being for a portable camp stove. Therefore, the illustration herein is such a stove. Illustrative of prior art stove connectors are those in the commercial Atone CB-55E and that of Camping Gaz as seen in EPO publication 0 278 873 A1.

The inventive connector includes means providing a flow path from a canister containing liquified petroleum gas (LPG) and having a cap with outlet means at the upstream end of the flow path, a valve assembly adapted to be connected to the canister cap and equipped with conduit means adapted to be connected to a combustion appliance at the downstream end of the flow path, the flow path being equipped with means for promoting vaporization of the LPG from liquid phase fuel intermediate the ends of the flow stream.

The invention also includes starting from the source of LPG, a unique dip tube for the canister, a unique slot and ear coupler for engaging and locking the valve assembly and canister together, a unique cam means in the valve assembly for achieving a seal with the canister cap, a unique conduit between the valve assembly and the burner assembly, an advantageously constructed burner assembly, and, for the camp stove application, a unique frame for supporting the burner assembly or assemblies and which is collapsible to compact and light weight condition for back-pack transport or the like. The invention provides a lightweight, compact/folding construction for a liquified petroleum fuel (LPG) such as butane or butane/propane mix fuel which is easy to light, and possesses operating convenience including good lighting, instantaneous flame control and good simmer characteristics.

Other objects and advantages of the invention may be seen in the ensuing specification.

BRIEF DESCRIPTION OF DRAWING

The invention is described in conjunction with the accompanying drawing, in which.

Sheet 1

Sheet 2

Figure 3:
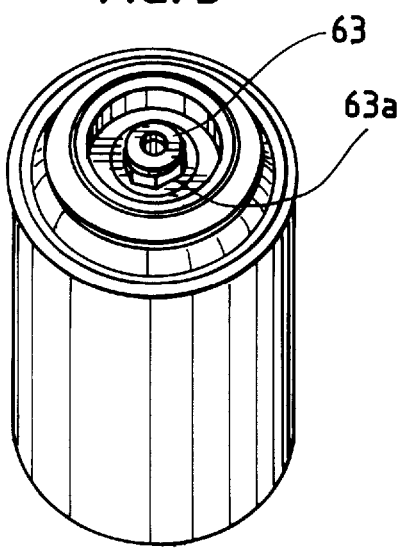
Figure 4:
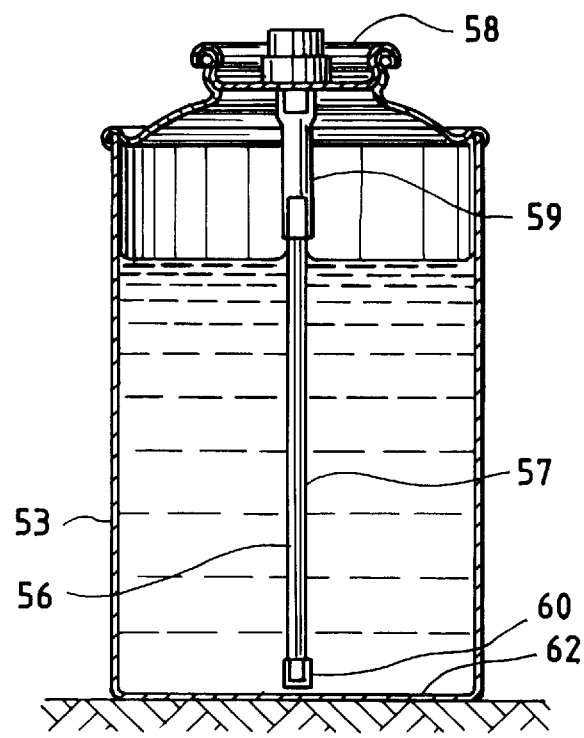
Figure 5:
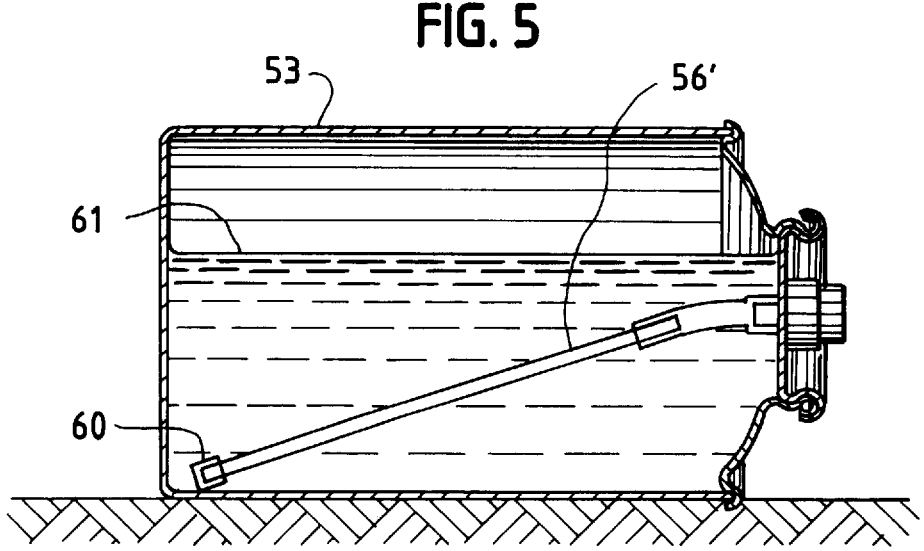

FIG. 3 is a perspective view of an aerosol-type canister used in the present invention to house the liquified petroleum gas fuel;

FIG. 4 is a sectional view of the canister of FIG. 3 and illustrates the inventive dip tube when the canister is in normal stored condition;

FIG. 5 is another sectional view of the canister of FIG. 3 but showing the disposition of the dip tube when the canister is disposed horizontally as may be the case in operating the camp stove;

Sheet 3

Figure 1:
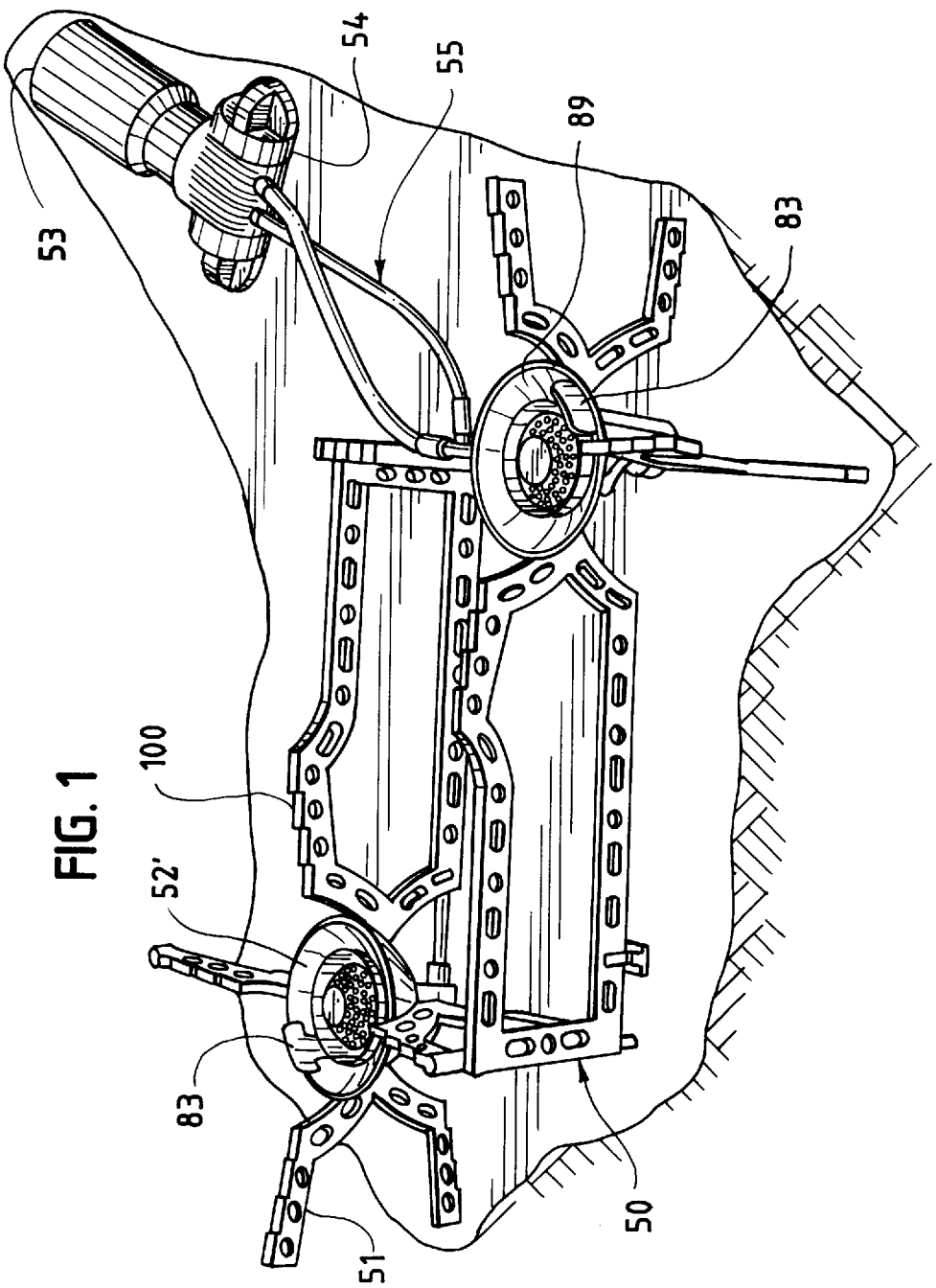
FIG. 1 is a perspective view of the invention as applied to a portable camp stove.

FIG. 6 is a fragmentary perspective view of the valve assembly of FIG. 1;

FIG. 7 is another perspective view of the valve assembly of FIG. 6;

FIG. 8 is another perspective view of the valve assembly of FIG. 1 but taken essentially at right angles to the views of FIG. 6 and 7;

FIG. 9 is an exploded sectional view of the camming members of the valve assembly as also seen particularly in the central portions of FIGS. 6–8;

Sheet 4

FIG. 10 is a fragmentary exploded sectional view of the valve assembly and canister of the preceding views;

FIG. 11 is a bottom plan view of the collet portion of the valve assembly as would be seen along the sight line 11—11 as applied to FIG. 10;

FIG. 12 is a bottom plan view of the cam portion of the valve assembly as would be seen along the sight line 12—12 as applied to FIG. 10;

Sheet 5

Figure 13:
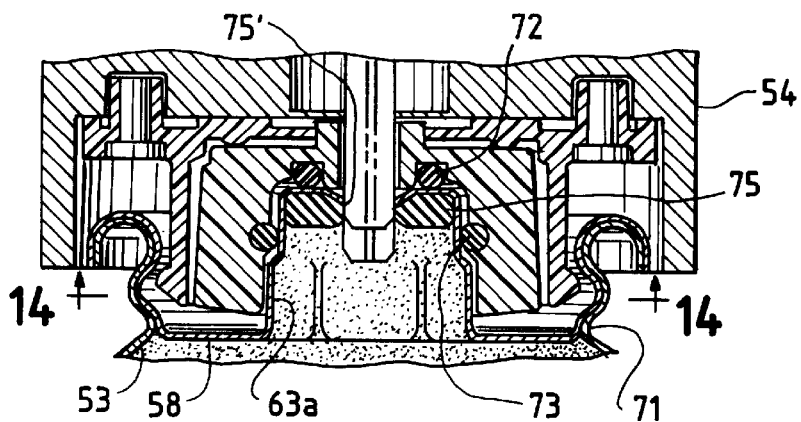
Figure 14:
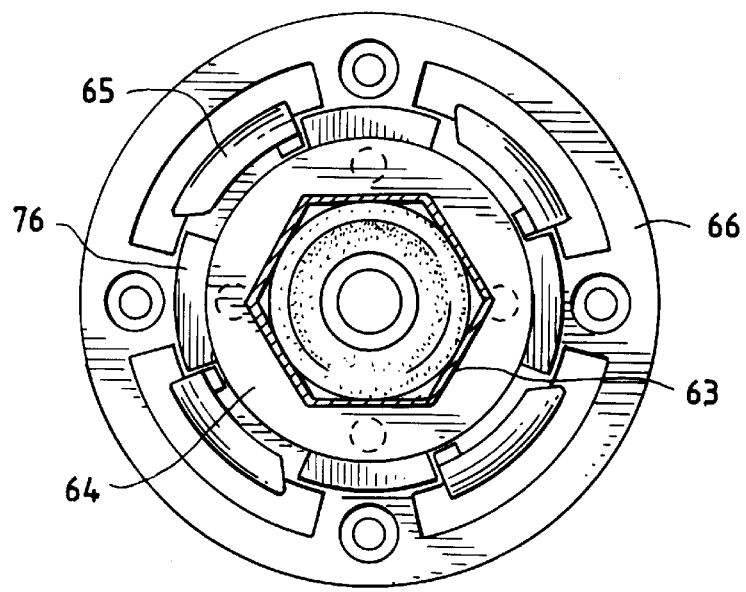
Figure 15:
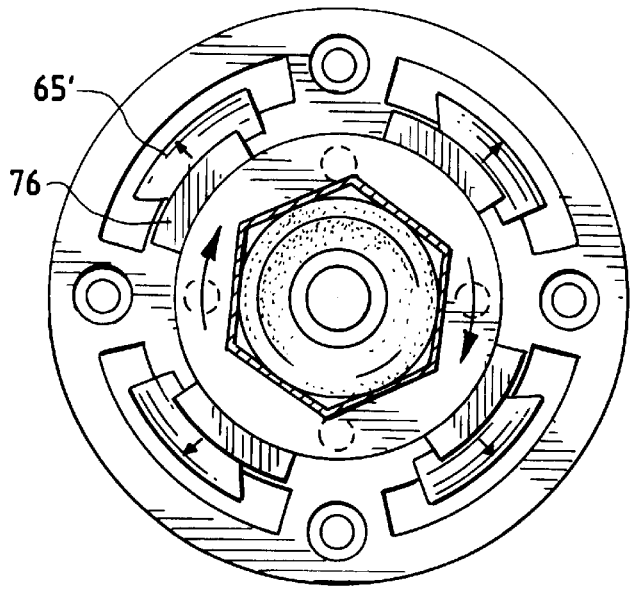

FIG. 13 is a view similar to FIG. 10 but with the valve assembly connected to the canister;

FIG. 14 is a view taken along the sight line 14—14 as applied to FIG. 13 and showing the collet and cam members in condition prior to operative engagement;

FIG. 15 is a view similar to FIG. 14 but showing the collet and cam members in operative engagement;

Sheet 6

Figure 19:
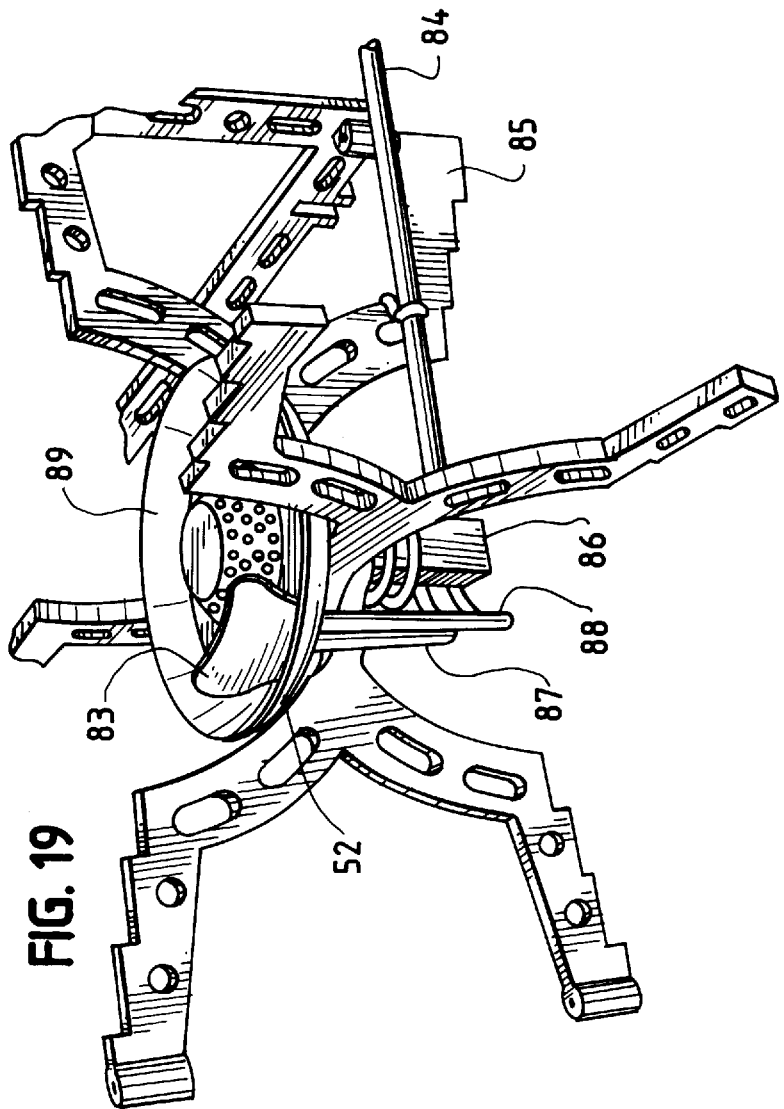

FIG. 16 is a fragmentary perspective view of the stove of FIG. 1 to illustrate the conduits between the valve assembly and one of the burners;

FIG. 17 is an enlarged sectional view as seen along the sight line 17—17 as applied to FIG. 16;

FIG. 18 is a longitudinal sectional view as seen along the sight line 18—18 applied to FIG. 17;

FIG. 19 is a fragmentary perspective view to further illustrate the conduit on the underside of the burner;

Sheet 7

Figure 20:
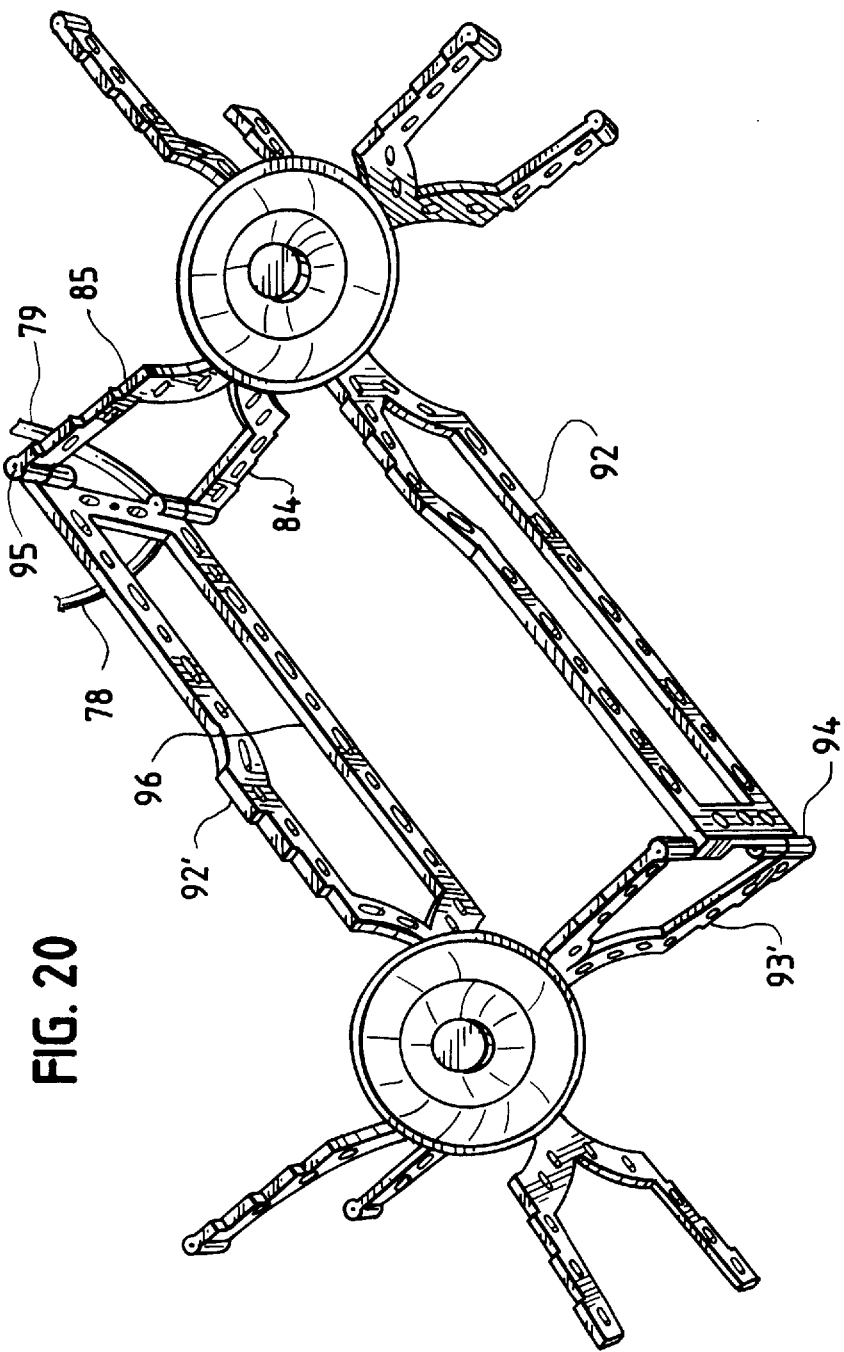
Figure 21:
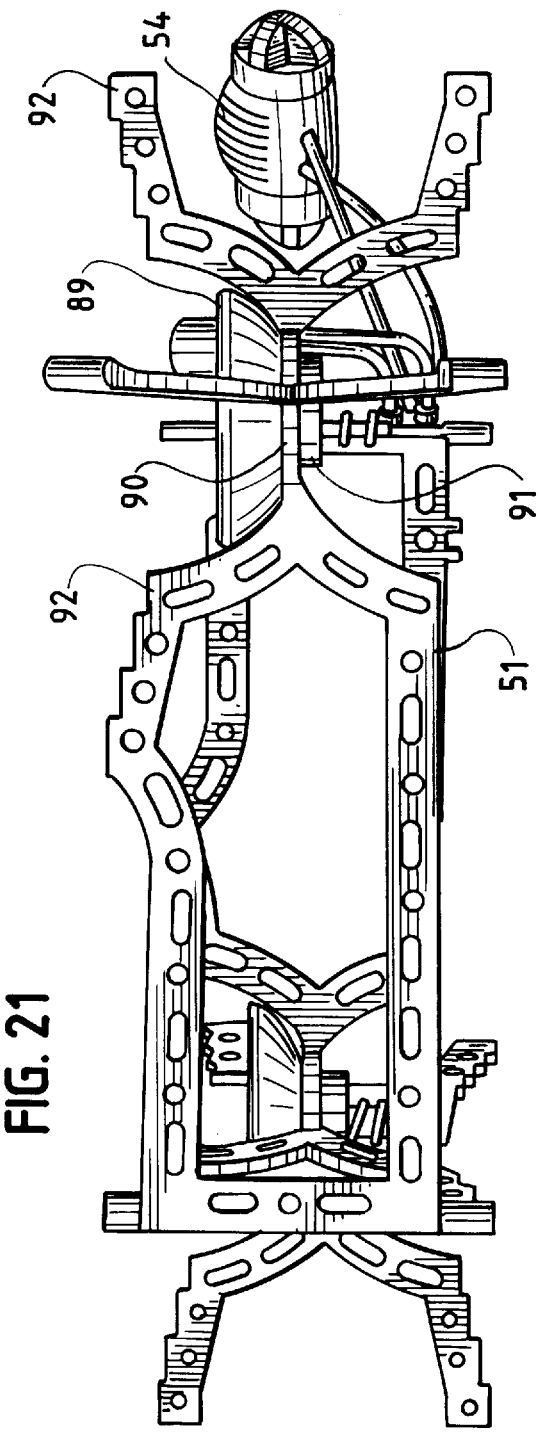

FIG. 20 is still another fragmentary perspective view of the stove of FIG. 1 and oriented so as to show the pivot corners of the pivotally collapsible frame;

FIG. 21 is yet another fragmentary perspective view of the FIG. 1 stove and oriented so as to particularly show the pivots under the burners;

Sheet 8

Figure 25:
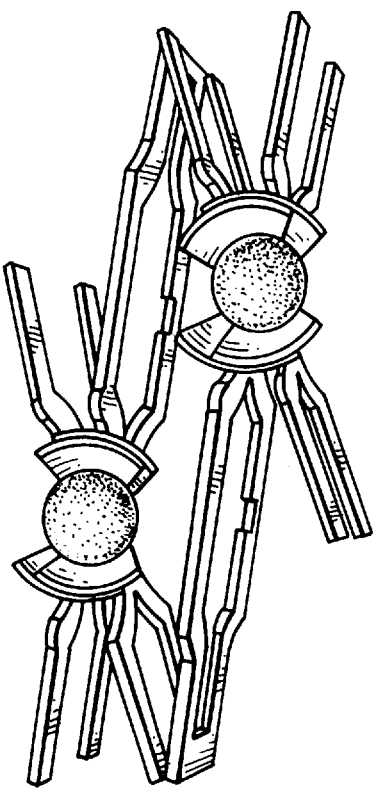
Figure 26:
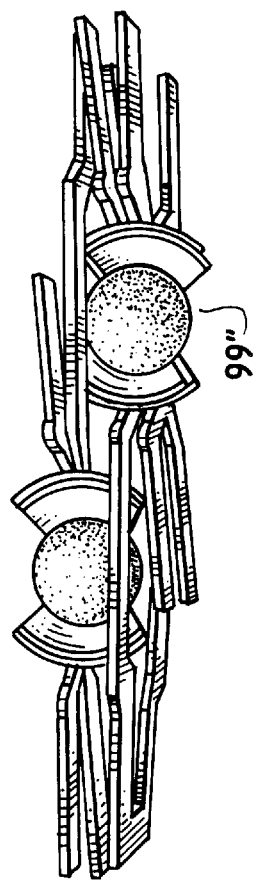

FIG. 22 is a perspective view illustrating the foldability of the appliance frame;

FIG. 23 is a rear perspective view of the model of FIG. 22;

FIG. 24 is an enlarged fragmentary perspective view of the right hand end portion of the model showing of FIG. 22 and with folding just started as can be appreciated from the gap between adjacent segments making up the bowl-like wind screen of the burner;

FIG. 25 is a view of the model of FIG. 22 almost completely collapsed;

FIG. 26 is a view of the final stage of folding as can be appreciated by the almost total stacking of one bowl segment on the other;

Sheet 9

Figure 27:
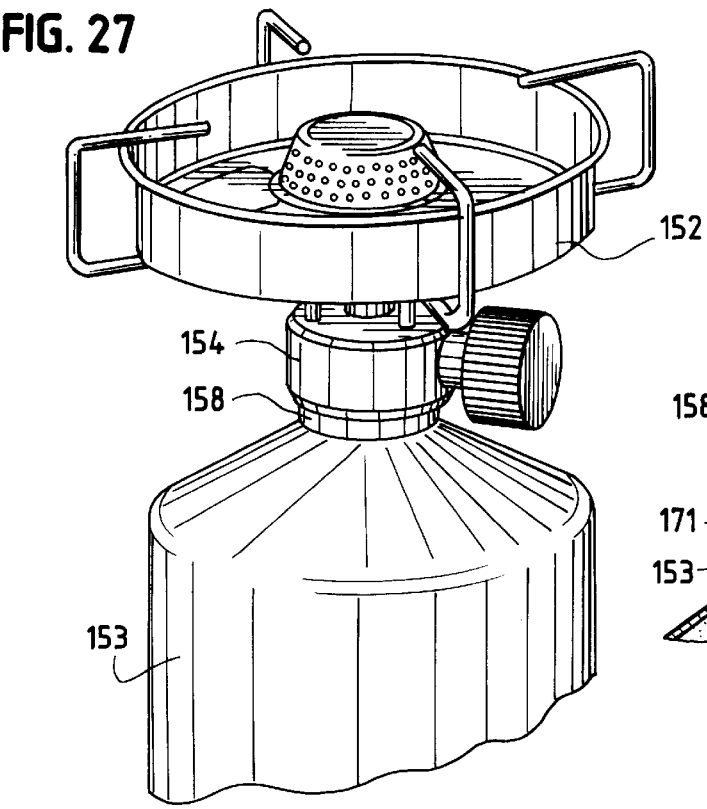
Figure 28:
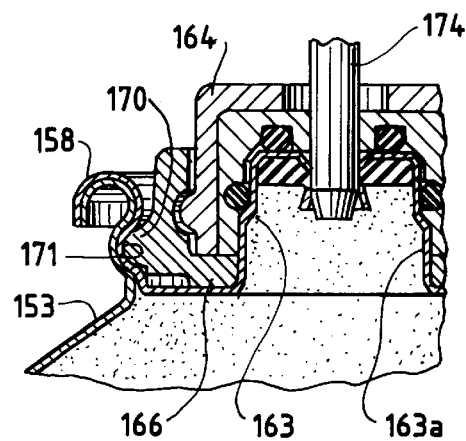
Figure 29:
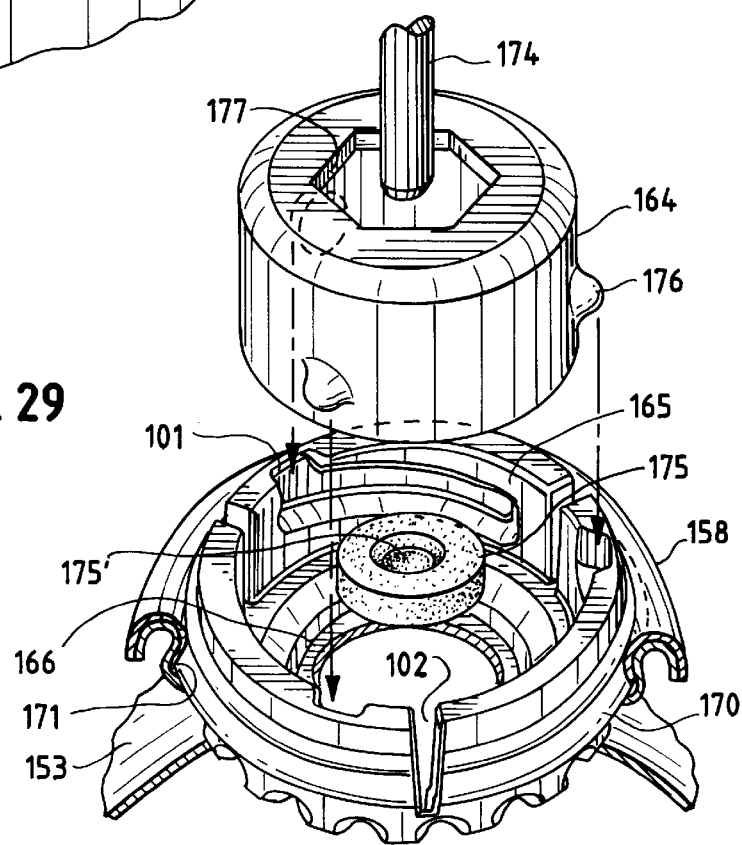

FIG. 27 is a fragmentary perspective view of another embodiment of the invention—this featuring a stove with a single burner;

FIG. 28 is a fragmentary perspective view featuring a second embodiment of connector;

FIG. 29 is a fragmentary exploded perspective of the connector of FIG. 28;

Sheet 10

Figure 30:
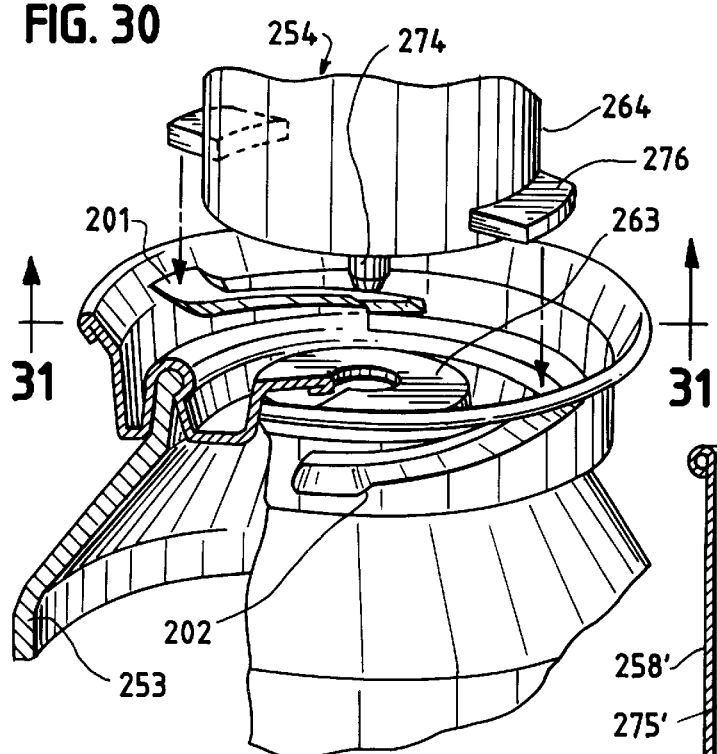
Figure 32:
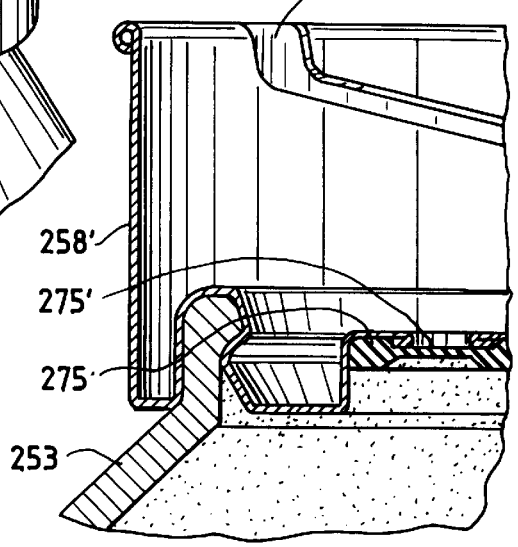
Figure 31:
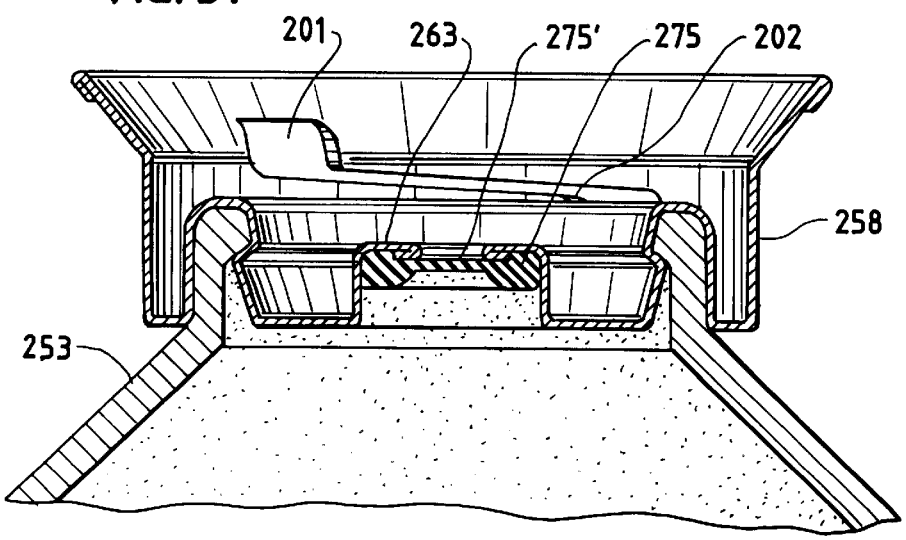

FIG. 30 is a fragmentary perspective view of a third embodiment of connector;

FIG. 31 is a sectional view as seen along the sight line 31—31 of FIG. 30;

FIG. 32 is a view similar to FIG. 31 but of a modification thereof;

DETAILED DESCRIPTION GENERALLY

In the illustration given and with reference first to FIG. 1, the numeral 50 designates generally the portable camp stove which exemplifies advantageous use of our invention. The stove includes a collapsible or foldable frame 51 (see FIG. 2) which supports two identical burners 52 and 52'—the latter being in the upper left.

Starting at the upper right in FIG. 1, this application of the invention includes a canister 53 containing LPG fuel. More particularly, the fuel may be a butane/propane mixture in liquid form and the canister is of conventional aerosol design such as that provided for in U.S. Department of Transportation Specification 2P or 2Q.

Connected to the cap of the canister 53 is a valve assembly 54. Coupling the valve assembly 54 to the burners 52, 52' are conduit means generally designated 55. As indicated previously, there are inventive features in each of the components just mentioned and these will be described in serial fashion, starting with the canister. Thus, there is a flow path P from the cap of the canister 53 to the burners 52, 52'.

Canister

The canister 53 is described in conjunction with FIGS. 3–5 on Sheet 2. An especially advantageous feature of the canister is the dip tube generally designated 56 illustrated in FIG. 4. There, it is seen that the major portion of the length is a metal tube 57. This is attached to the canister cap 58 by means of a flexible plastic coupling 59. The free end or tip of the metal dip tube 56 is also equipped with a flexible plastic sleeve 60. The function of the sleeve coupling 59 is illustrated by the condition 56' of the dip tube in the FIG. 5 showing. There, it is seen that the free end of the dip tube has fallen to the lower side of the horizontally-disposed canister. The weight of the metal tube 57 and the flexibility of the coupling 58 insure that the end of the dip tube is always below the level 61 of the liquid fuel.

The metal tube 57 is advantageously constructed of brass or steel and is of a length sufficient to extend almost to the bottom 62 of the canister 53. We prefer to terminate the metal tube 57 somewhat short of the bottom so as to accommodate the mounting on the metal tube end of the terminal plastic sleeve 60. This is optimal functionally but desirable aesthetically to cushion against or avoid a clanking noise when the canister 53 is shaken. Without the sleeve 60, the free end of the metal tube 57 would "clank" when impinging against the sidewall of the metal canister.

As indicated above, both sleeves 59 and 60 are constructed of flexible plastic material which must be capable of withstanding chemical attack by LPG over many years. A suitable flexible urethane tubing is a product designated Tygothane available from Norton Performance Plastics Corp. located in Akron, Ohio.

A metal tube 57 for the major length of the dip tube is preferred principally to provide sufficient weight to insure that the dip tube free end always falls to the lowest portion of the canister irrespective of the orientation of the canister. This weight also advantageously counter acts any tendency of the plastic sleeve 60 to stick to the metal wall of the canister—and which could be a problem with a dip tube constructed entirely of plastic. A rigid plastic tube may be substituted for the metal tube provided that weight is provided at its free end to assure that the free end always falls to the bottom.

Another feature of the canister 53 is the non-circular pedestal 63—see also FIG. 10 where the lower part 63a is different from the upper part 63b. This lower part 63a is illustrated as a hexagonal shape but other non-circular shapes may be employed. Such noncircular shapes aid the cam 64 in expanding the fingers 65 of the collet 66—compare FIGS. 9 and 10. The non-circular shape also prevents use of the canister 53 in an inoperative environment—as with a vapor withdrawal appliance.

In summary, the liquid withdrawal canister with the hinged and weighted dip tube 56 causes the dip tube to always fall to the bottom, i.e., lowest part, of the canister, irrespective of orientation and particularly when the canister is horizontal which could be the normal orientation in use in the field.

Valve Assembly—Valving

The valve assembly 54 (see FIG. 1) is described first in conjunction with FIGS. 6–8 on sheet 3. In addition to providing valving for controlling the flow of fuel to the burners 52, 52' the assembly 54 also provides an advantageous mounting for the cam 64 and the collet 66. This structure and function of the assembly 54 can also be seen in FIGS. 6–8 and additionally in FIGS. 9–15 which deal more particularly with the connecting function of the valve assembly 54.

The valving function of the assembly 54 is performed by essentially conventional means. An indented knob 67 is provided for each valve—one for each burner 52, 52'. These knobs are connected to taper type valves (not shown) but contained within the assembly body 68. A suitable form of valve can be seen in British Patent No. 2 262 156B.

More particularly, the valve assembly 54 provides a mounting for one or more control valves each with taper closure mechanisms and internal passages having minimal internal volume. Each taper valve controls a burner from the single fuel canister 53. The valves are surrounded in heat conductive relationship with a heat sink—as illustrated by the aluminum body 68 which may additionally be equipped with fins 69. This heat sink assures vaporization of fuel at a low input setting and an initial light up. Without the heat sink, vaporization which occurs at the valve needle could cause the temperature to fall and then vaporization would occur upstream of the valve. Since the amount of liquid upstream of the valve would be dependent upon random factors like duration of operation, flow rate, and ambient temperature, unpredictable operation would result and the ability of the valve to control low flame operation would be impaired. At low fire, liquid upstream of the valve also causes pulsing of the flame as vapor pushes the liquid back and forth in the system. The heat sink keeps the temperature up to help avoid these problems. Although, the heat sink has little effect at higher fuel output levels, this higher level cannot always be the case so it is important to provide for the low flame, low output level. Another adverse symptom of upstream vaporization is a sputtering sound particularly when there is flame variability. Such a drawback likelihood is increased where there is excess space in the valve and in the passage near the valve.

Valve Assembly—Connection to Canister

Referring again to FIGS. 6–9, two of the parts used in connecting the valve body 68 to the canister 53 have been mentioned previously—the cam 64 and collet 66—which can be seen clearly in FIGS. 7 and 9. The collet is so named because like a lathe collet it has a collar providing fingers or portions between slots that perform a holding function. Briefly, the cam 64, when rotated— as by using the canister as a handle—forces the enlarged ends or pawls 70 on the collet fingers 65 outwardly into an annular groove 71 in the canister cap 58—see FIG. 10. This then locks the valve body 54 to the canister 53 with two seals 72, 73 interposed between the body 54 and canister 53—see FIGS. 10 and 13.

Initially, the valve assembly 54 and canister 53 are in the positions shown in FIG. 10—with the downwardly extending probe 74 being aligned with the depression or recess 75' in the seal 72 in the cap 58. Then, downstream movement of the valve assembly 54 toward the canister 53 (or vice versa) brings about opening of the canister seal 75 as at 75' in FIG. 13. The relative positions of the collet 66 and cam 64 are as shown in FIG. 14. further, the cam 64—compare FIGS. 9 and 12—is equipped with L-shaped radially outwardly extending lugs 76. These, when the cam and collet are in the FIG. 13 condition, the fingers 65 and lugs 76 are not aligned—see the 9 and 10 o'clock locations in FIG. 14.

The second and final step in connection is to rotate the cam 64 to align the lugs as at 76' with the fingers as at 65'—see FIG. 15. This is done by using the canister 53 as a handle with the hexagonal pedestal 63 being like a screwdriver to enter the hexagonal opening 77 in the cam 64. Then, turning or rotating the canister rotates the cam 64 and with it the L-shaped radially extending lugs 76. When this happens, the lugs 76 engage or "cam" the fingers 65 to press the enlarged portions or pawls 70 outwardly and into the annular groove 71 in the cap portion of the canister 53. Thus, until the canister is re-rotated, the valve assembly 54 and canister 53 remain locked together with the seals 72 and 73 under compression to prevent leakage escape of the fuel. This rotation is highly reliable because the axis of the canister 53 (and thus the pedestal 63) is coincident with the axes of both the cam 64 and the collet 66.

Another advantage of the inventive arrangement of cam and collet over the prior art is the fully perimetric application of force from the canister 53 to the cam 64 to the collet fingers 65. Whether the opening 77 about the coincident axes is hexagonal or other non-circular shape, there are rotation inducing forces at a plurality of points or portions about the coincident axes which promotes easy and complete seating of the finger pawls 70 in the groove 71. Further advantageous in this regard is the single direction movement of the fingers so as to cause the pawls to enter the groove 71. By rotating only the cam 64 and not the collet 66, the fingers 65 are urged only radially outwardly (but not circumferentially) which promotes quick and secure seating of the pawls 70 in the groove 71.

In summary, the structure for locking the canister 53 to the valve assembly 54 includes the non-circular pedestal 63 which enters the non-circular opening 77 in the cam 64. The cylindrically-shaped cam is equipped with a plurality of integral, radially extending lug means 76 which rotate with the cam under the influence of the turning pedestal 63. The rotating lug means 76 of the cam 63 engage the fingers 65 (as at 76' in FIG. 15) of the cylindrical collet 66 to force the pawls 70 into the groove 71 in the cap 58. Inasmuch as the fingers 65 do not rotate, merely flex radially outwardly to position the pawls 70 in the groove 71, there is no circumferential movement of the pawl means 70 carried by the collar-like body of the collet 66.

Conduit Means

This portion of the invention is explained with reference to FIGS. 16–19 on Sheet 6. FIG. 16, for example, shows the lower right hand burner 52 of FIG. 1. The conduit means 55 of FIG. 1 include two tubular conduits 78, 79 going from the valve assembly 54 (shown only fragmentarily in FIG. 16—and in the lower right corner) to the burner 52 (and to the "not shown" burner 52'). The conduit 78 extends from the valve assembly 54 to the right hand burner in FIG. 1—this being the lower burner in FIG. 16.

The novel and advantageous construction of both conduits 78, 79 is exemplified by the conduit 78 depicted in FIGS. 16–18. Turning first to FIG. 17 and starting at the outside, there is a protective braid 80 which may be metal or plastic. In the illustration given both the braid 80 and the flexible tubing 81 are constructed of TEFLON®. The tubing 81 is packed with a solid flexible plastic rod 82 also of TEFLON® in the nature of a spin trim line which has been specially trimmed to assure a consistent diameter. In the illustrated embodiment, the conduit tubing 81 has an I.D. of approximately 0.0125" (about 3 mm) and the plastic cylindrical rod has an O.D. of approximately 0.004" (about 1 mm) less.

The purpose of the rod is to reduce the volume of the conduit and to provide a large heat absorbing surface. It also causes a pressure drop across the conduit. The combination of heat absorption and pressure drop causes consistent vaporization during light up which is helpful in avoiding flaring before the generator 83 (see FIG. 1) is hot enough to vaporize any carried-over liquid fuel.

Also packed are the rigid conduits which extend from the ends of the flexible conduits 78, 79 to where these rigid conduits meet the frame 51. For example, the flexible conduit 78 connects with a rigid conduit 84 (see the central part of FIG. 16). The rigid conduit (which is advantageously made of brass) lies along and is supported by frame member 85. The conduit 84 connects to the burner 52 as seen in FIGS. 16 and 19. The packing here is brass rodding having an O.D. of approximately 0.063" (1.6 mm) with the brass tubing having an I.D. of approximately 0.068" (1.7 mm). The packed brass conduits operate in the same fashion as the packed flexible conduits.

The same structural arrangement applies for the brass (rigid) conduit coupled to the flexible conduit 79 for delivering fuel to the other burner (not shown in FIGS. 16 and 19).

The rigid fuel conduit 84, for example, is connected to a brass block 86 positioned below the burner air inlets (not shown). Fuel is conducted through a passage in the brass block 86 to a generator tube 87 which extends upwardly toward the burner flame zone. The tubular passage then goes through the generator 83 and then downwardly back via tube 88 to the brass block 86. Thereafter, the flow path continues through another passageway in the block 86 upwardly to a conventional orifice. The orifice discharges fuel (now a gas) to a conventional venturi and then the resulting fuel/air mixture flows to the burner for burning. The portion of the generator tube 87–88 in the flame zone preferably is provided with a heat sink plate—see the wider or enthickened portion 83 to increase the transfer of heat from the flame to the generator and thereby increase vaporization of fuel in the generator.

The Frame and Burners

The burner 52 of FIG. 1 is equipped with a 360° unitary, bowl-shaped wind screen 89—see also FIGS. 19 and 21. This is positioned between the burner and the pivots 90, 91 on the X-providing supports 92, 93 respectively—compare FIGS. 20 and 21. A similar pivot assembly is provided under the burner 52'—see the lower left corner of FIG. 20. However, it is clear that if only one burner is desired—but an X-type framework desired—only the X members 92, 93 need be employed. And the other X providing members 92', 93' are not required. But the X configuration provides a stable base for cooking, etc. By adding X sections, additional burners may be added. Advantageously, the X members may be constructed of light weight metal such as magnesium alloy or aluminum alloy. However, dependent upon usage and other physical conditions, other materials may be employed.

Reference to FIG. 20 (and also FIG. 1) reveals that the two burner frame 51 is generally rectangular when uncollapsed. Pivots are provided at the "non-burner" corners 94, 95. The latter corner 95 serves as the entry of the flexible conduits 78, 79.

The rigid fuel conduits 84, 96 (FIG. 20) are carried on the lower portions of burner frame 51, i.e., one of lower legs of XX frame. When either the X or XX is folded to "flat" configuration, the rigid conduits become substantially parallel with their remote from the burners being ends slightly outside of folded X body. This permits flexible conduits and valve/heat sink to fold up over burner for compact storage. The general compactness of the frame 51 can be appreciated from the sequence of views on the eighth drawing sheet (FIGS. 22–26). The model shown there omits the conduits but, even still, it is important to note how compact the folded frame is in FIG. 26. There, the bowl quadrants are virtually completely stacked, i.e., each upper one almost eclipses the associated lower one—this in contrast to the slight gap in FIG. 22. For detailed explanation, we designate one of the upper quadrants 97 in FIG. 24. The partially eclipsed quadrant is 98. At this preliminary stage of folding, there is a gap 99 of about 20°. This is in contrast to the virtually eliminated gap 99' in the FIG. 22 unfolded condition—and further to about the almost 90° gap 99" of FIG. 26.

To achieve the foregoing pivoting action of the bowl segments, each of these is attached to an appropriate leg of the X support. This reduces the width of the folded frame with little increase in height.

The burner frame 51 illustrated consists of two "XX shaped" members which are pivotally connected to form a rectangle with the sides between extended beyond the crossover points of each X. The burners are positioned at these X crossing points—see particularly FIG. 22.

The configuration allows the addition of additional X's to permit the stove to be configured with two or more burners. In the multiple burner configuration, the two unconnected, viz., distal, ends of each X are attached together with a pivot pin. The arrangement allows the stove to be folded as flat for storage and transport, an important feature for back packability. As indicated before, the burner bowl is constructed of four curved segments—two of which are attached to an appropriate part of an X leg. This allows the burner bowl to rotate with the X legs to provide more compact storage configuration.

Figure 2:
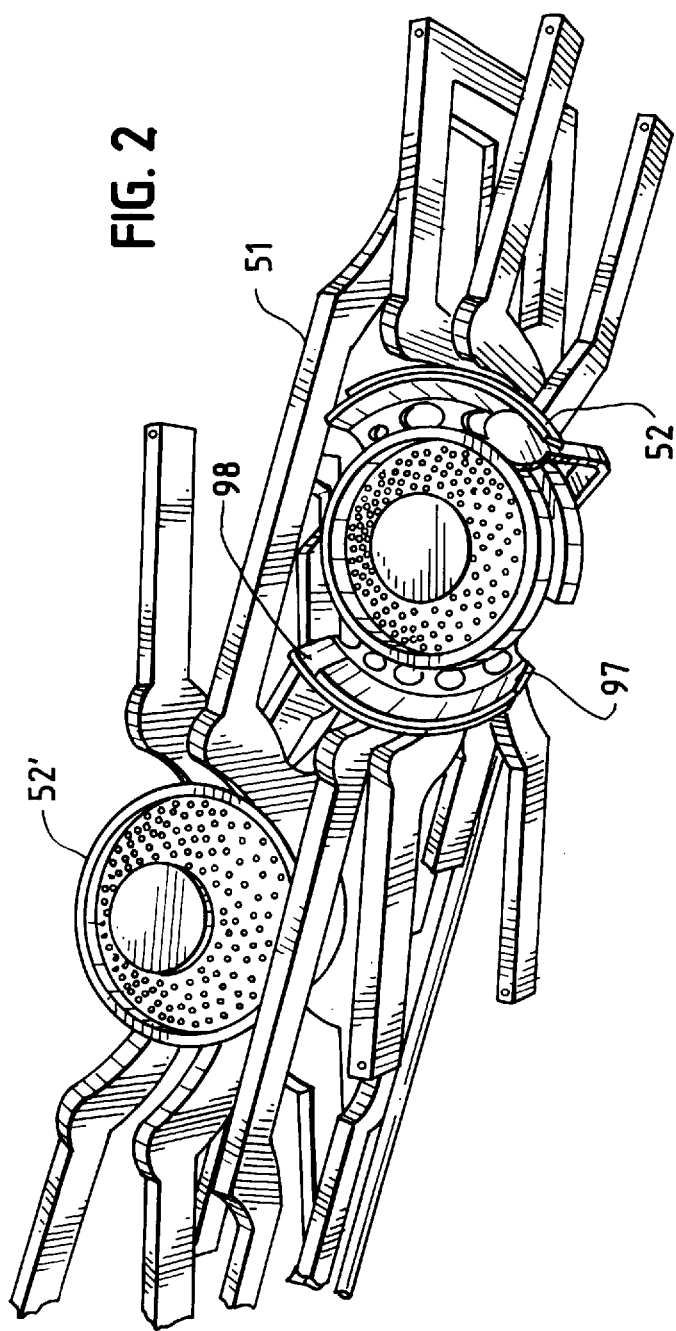
FIG. 2 is a fragmentary perspective view of a collapsed stove similar to that seen in FIG. 1, a difference lying in the burner cap wind screen construction—unitary in FIG. 1 but segmented in FIG. 2.

The illustrated version of the stove as in FIGS. 1 and 2 has material removed from the inside of the X members to reduce weight. This version—see particularly FIG. 1 has a series of steps as at 100 to optimally support pots and pans. For example, in the illustration given, the steps can accommodate four different size vessels—the steps increasing in height above the ground as they are located further from the pivot center. Also, the steps may be sloped downwardly toward the pivot center, i.e., the center of the pot, pan, etc. for greater stability.

Returning to the specific illustration given, the burner frame 51 consists of two "X" shaped members which are pivotally attached together at the crossover point of each X. In a two burner embodiment, one leg of an X support for each burner is provided with an extended top and bottom portion, the distal end of which is connected to corresponding portions of the other burner X support. The rigid fuel conduit for one of the burners is attached to the lower member of one of these extensions. The other rigid fuel connection is attached to the lower member of the X support of the other burner which is pivotally attached to the extension. This arrangement allows the folding of the flexible conduit and valve assembly over the stove when it is flattened and permits the flexible conduit to be essentially parallel when the stove is in the operating position. Also advantageous is the fact that the burner venturi assembly can serve as a pivot.

Second Connector Embodiment

Reference is now made to Sheet 9 of the drawing and to FIGS. 27–29. Two alternative features of the invention are illustrated. First, in FIG. 27, there is a single burner form of camp stove—seen mounted directly on the canister 153, i.e., without the interposition of flexible conduit means. However, conduit means are provided as part of a valve assembly 154 and which advantageously provide the promotion of vaporization of the conduits, etc. of the first described embodiment.

The burner 152 is equipped with U-shaped supports for supporting a pot, pan or the like. The canister 153 is equipped with a cap 158 (see also FIG. 28). Positioned immediately above the cap 158 is the valve assembly 154. The burner 152 is rigidly carried by the valve assembly 154. What is especially novel and advantageous is the connection between the valve assembly 154 and the cap 158.

This embodiment also employs a collet-type member 166—better seen in FIG. 29—and a cam member 164 also seen in perspective in FIG. 29. The cam member 164 also has associated therewith the probe 174—carried by the valve assembly 154 in fixed relation to the cam member 164 which is also rigidly mounted on the valve assembly 154.

Differing from the first embodiment is the fact that the collet member 166 is provided as part of the cap 158. The cap 158 again has the inwardly facing annular or circumferential groove 171 into which an annular rib 170 (corresponding to the pawls 70 of the first embodiment) provided on the collet 166 is received.

As the cam member 164 is brought toward engagement with the collet member 166 carried by the cap 158—the condition depicted in FIG. 29—the radially outwardly extending lugs 176 on the pan member 164 are aligned with the open ends of the L-shaped slots 101 provided in the fingers 165. These fingers 165 in collet-like fashion are separated by axially-extending slots or separations 101.

As the lugs 176 engage the L-shaped slots 101, they follow the slot contour as the canister 153 is rotated. Again the canister is provided with a stepped pedestal 163 where the lower step 163a is non-circular. Again, in the illustration given, a hexagonal shape is employed—to match opening 177 in the cam member 164. As the canister is rotated relative to the valve assembly (or vice versa) the lugs 176 move further down the L-shaped slots 101 which become shallower—developing a more secure seat of the cam member 164 (and therefore the valve assembly 154) in the collet member 166 (and therefore the cap 158 of the canister 153). This results in two advantageous functions. First, the fingers 165 are forced outwardly—further seating the annular rib 170 in the annular recess 171. Second, this brings the probe 174 downwardly through the web 175—more particularly the thinner recessed web 175' to effectuate a secure seal.

Third Connector Embodiment

The third embodiment is seen in FIGS. 30–32 on Sheet 10. This embodiment has the collet and cap combined and also provides the same vaporization promoting operation downstream of the canister.

In each of FIGS. 30–31, the numeral 253 designates the canister equipped with a rolled-on cap 258. The cap is equipped with a centrally apertured boss 263 somewhat akin to the pedestal of the preceding embodiments. The boss 263 has fitted therein a seal 275 having a recessed thinner area 275'. This is engaged by the probe 274 provided as part of the lower housing 264 of the valve assembly generally designated 254 (seen only in FIG. 30).

The lower housing 264 is equipped with a pair of opposed lugs 276 which are engageable with a pair of opposed ramped slots 201. As the lugs enter the slots, relative turning movement (¼ turn) of the valve assembly and canister cap results in the parts being pulled together, the probe 274 rupturing the thin web 275' and the lugs being temporarily locked by the detent 202 adjacent to but spaced from the lower end of each slot 201. This results in the two parts (canister cap 258 and valve assembly 254) remaining connected. And when disconnection is indicated, all that is required is a reverse ¼ turn.

To provide a greater engagement or entry of the lower housing into the cap, the modification of FIG. 32 may be employed. There, all the parts are the same except the vertical wall of the cap is lengthened and has a rolled top—as at 258'. Also, the ramped slot is different. In FIG. 32, the slot 201' is seen to have its upper terminus in the rolled upper edge of the cap, rather than the flared upper edge of the FIG. 31 embodiment. In either event, the same advantageous operation relative to promoting flow path vaporization is available.

Summary

The invention of an LPG canister connector for a combustion appliance 52, 52' includes means providing a flow path P from a canister 53, 153, 253 containing liquid fuel and having a cap 58, 158, 258 with outlet means at the upstream end of the flow path P, a valve assembly 54, 154, 254 adapted to be connected to the cap and equipped with conduit means adapted to be connected to a combustion appliance 52, 52', 152 at the downstream end of the flow path, the flow path means being equipped with means for promoting vaporization of the fuel intermediate the ends of the flow path P.

The vaporization promoting means may take a variety of forms. For example, the most upstream position for this to occur is in the valve assembly 54, 154, 254. In addition to the aluminum or other metal body which makes up the valve assembly, other heat sink producing structures may be employed such as the fins 69.

Another example of the vaporization promoting means are the flexible and rigid conduits. By "packing" them, it is reasonably convenient to achieve a large heat absorbing surface and a reduction of volume in the flow path downstream of the canister, viz., lower flow rates.

Still further, the use of metal in junctions particularly where flow directions change, can be helpful in promoting vaporization of the last vestiges of liquid. Exemplary of this are the block 86 and the generator 83.

The invention, as indicated above, finds use in connection with lanterns—particularly the mantle type which operates advantageously on liquid fuel. There, we interpose thermal insulation in the flow path between the generator and the burner tip or jet. This promotes vaporization prior to the burner in a configuration generally like that of FIG. 27. A suitable burner for the lantern and the other embodiments hereof can be seen in British Patent 2 262 157B.

While in the foregoing specification a detailed description of embodiments of the invention have been set down for the purpose of illustration and compliance with the statute, many variations in the details hereingiven may be made by those skilled in the art without departing from the spirit and scope of the invention.

We claim:

1. An LPG canister connector for providing a flow path from a canister, containing liquid fuel and having a cap with an outlet, to a combustion appliance, said connector comprising:

a valve assembly adapted to be connected to the cap to withdraw the liquid fuel from the canister; and a conduit downstream of said valve assembly and adapted to be connected to the combustion appliance, at least one of said valve assembly and said conduit including means for promoting vaporization of the liquid fuel within or downstream of the valve assembly.

2. The connector of claim 1 in which said vaporization promoting means includes a heat sink.

3. The connector of claim 2 in which said heat sink is provided on said valve assembly.

4. The connector of claim 3 in which said heat sink includes fins on said valve assembly.

5. The connector of claim 1 in which said vaporization promoting means includes means for increasing heat absorption while decreasing flow rates of the liquid fuel.

6. The connector of claim 5 in which said means for increasing heat absorption while decreasing flow rates comprises a filler in said conduit.

7. The connector of claim 6 in which at least a portion of both of said conduit and said filler are constructed of a flexible plastic material.

8. The connector of claim 6 in which at least a portion of both of said conduit and said filler are constructed of a rigid metal.

9. The connector of claim 1 in which said vaporization promoting means is included in said conduit and includes a metal member.

10. The connector of claim 9 in which said metal member includes a block, with a flow passage therethrough, disposed adjacent the combustion appliance.

11. The connector of claim 9 in which said metal member includes a generator tube and a heat sink disposed on said generator tube.

12. The connector of claim 11 in which said generator tube heat sink comprises a plate adapted to be positioned adjacent a burner of the combustion device.

13. A stove comprising the connector of claim 1 in combination with a burner assembly and a collapsible frame, said collapsible frame comprising a pair of support members, said pair of support members being pivotal relative to one another about a common pivot axis on which said burner assembly is supported.

14. The stove of claim 13 further comprising another burner assembly, and in which said collapsible frame further comprises another pair of support members, said pairs of support members being interconnected with one another, said other pair of support members being pivotal relative to one another about a common pivot axis on which said other burner assembly is supported.

15. The stove of claim 14 in which said collapsible frame is movable between (i) an operating configuration, in which said support members are disposed in a quadrilateral configuration with a pivot at each corner of the quadrilateral configuration and (ii) a collapsed configuration, in which said support members are juxtaposed in a compact arrangement.

16. The stove of claim 15 further comprising a segmented windscreen disposed about each burner assembly, and wherein folding of the collapsible frame collapses the windscreen.

17. The connector of claim 1 in which said valve assembly further comprises a cylindrical cam and a cylindrical collet, said cam having a non-circular axial opening sized to be engaged by a non-circular pedestal of the canister, said cam being equipped with a lug and said collet being equipped with a pawl, wherein the canister cap includes an annular groove, such that when the pedestal of the canister engages the axial opening of the cam, rotation of the canister rotates said cam causing said lug to contact said collet and force said pawl into the annular groove.

18. A camp stove for use with a liquid fuel-containing canister, comprising:
a burner assembly;
a foldable frame, comprising a pair of pivotally connected members, said members having a common pivot axis on which said burner assembly is supported;
a valve assembly adapted to be connected with the canister to withdraw liquid fuel from the canister; and
a conduit connecting said valve assembly with said burner assembly.

19. The stove of claim 18 further comprising another burner, and in which said frame further comprises another pair of pivotally connected members, said other pair of members having a common pivot axis on which said other burner assembly is supported, said pairs of members arranged in quadrilateral relation with said burners at two opposing corners and pivots at the other two corners whereby said frame is collapsible into a narrow elongated structure.

20. The stove of claim 19 in which said frame is equipped with spaced steps for supporting and stabilizing any of a plurality of pots and pans of different sizes.

21. The stove of claim 19 further comprising a segmental bowl-shaped windscreen disposed about each burner assembly, said windscreens each comprising segments being mounted on different of said members so as to move into eclipsing relation upon collapsing of said frame.

22. A connector for interconnection between an LPG canister and a combustion appliance, comprising:
a valve assembly including a passage for fuel and a valve in said passage;
inlet means for attachment to the canister for withdrawal of liquid fuel from the canister, said inlet means including a multi-lugged cylindrical cam member and a multi-fingered collet member disposed about said cam member; and
an outlet attached to the combustion appliance.

23. An LPG canister comprising:
a generally cylindrical vessel having a top closure equipped with a sealable outlet;
a dip tube extending inwardly of said vessel from said outlet, said dip tube having a free end and including a flexible plastic tube connected to said outlet and a metal tube connected to said plastic tube.

24. The canister of claim 23 in which said dip tube further comprises a flexible tube over said metal tube adjacent the free end thereof, said flexible tube providing a cushion against impingement of the metal tube against the canister when the canister is reoriented.

25. The canister of claim 23 further comprising a pedestal having a non-circular portion and through which the outlet is disposed.

* * * * *